M. H. WILEY.
Oil Cabinet.
No. 4,035. Reissued June 14, 1870.
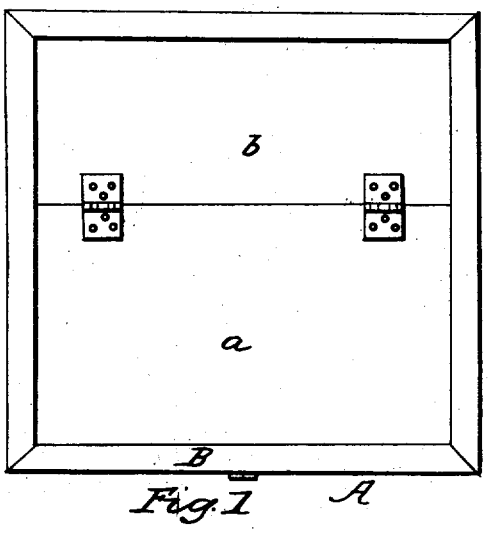
Fig. 1
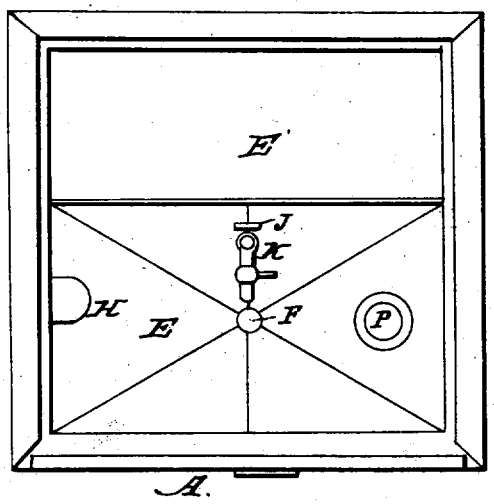
Fig. 2
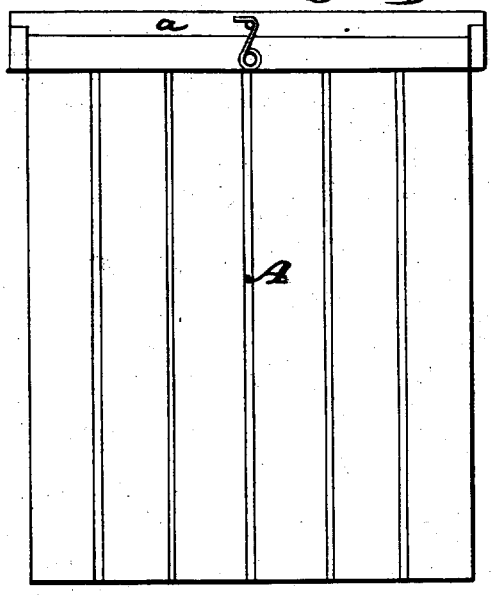
Fig. 4
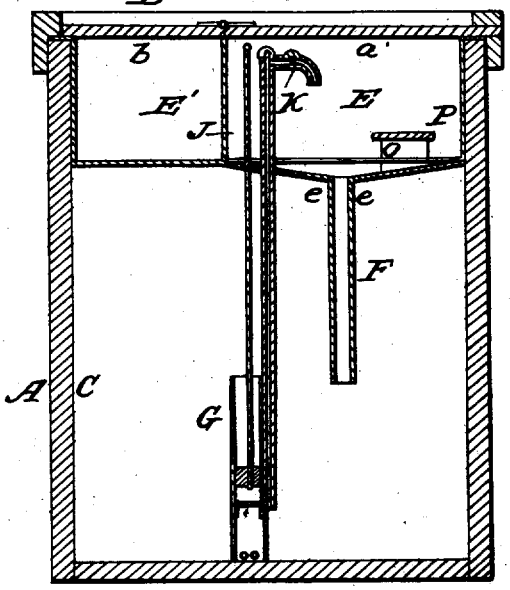
Witnesses
Jno. Brown
Henry Brown
Inventor
Moses H. Wiley
by his attorney,
F. P. Hale
N. PETERS, Photo-Lithographer, Washington, D. C.

United States Patent Office.

MOSES H. WILEY, THOMAS MILLER, AND JOHN H. B. LANG, OF EAST BOSTON, MASSACHUSETTS, ASSIGNEES OF MOSES H. WILEY.

*Letters Patent No.* 101,070, *dated March* 22, 1870; *reissue No.* 4,035, *dated June* 14, 1870.

IMPROVEMENT IN OIL CABINETS.

The Schedule referred to in these Letters Patent and making part of the same.

*To all persons to whom these presents may come:*

Whereas, MOSES H. WILEY, of East Boston, in the county of Suffolk and State of Massachusetts, did invent certain new and useful Improvements in Oil Cabinets, for which Letters Patent No. 101,070, and dated March 22, 1870, were granted to his assignees, (Moses H. Wiley, Thomas Miller, and John H. B. Lang,) now, therefore, we, the said Wiley, Miller, and Lang, do hereby declare the said invention to be fully described in the following specification, and represented in the accompanying drawing.

Of the said drawing—

Figure 1 denotes a top view; and

Figure 2, a side or end elevation of the said invention.

Figure 3 is a top view of the said invention with the cover removed.

Figure 4, a vertical and central section taken through the tank, the pump, and waste-receiving or return-pipe.

This invention relates to a new and useful, or improved article termed an "oil cabinet," the same being adapted for use on ship-board, in light-houses, stores, and many other places where oil is used, either for illumination or lubrication, and consists in so combining and arranging the oil tank, pump, and vent or waste-receiving pipe with a sink or with the latter and one or more compartments for holding lamps, chimneys, wicking, or other paraphernalia required in trimming or preparing lamps for use or vessels for lubrication, as to form a compact, neat, convenient, and useful piece of furniture.

In the said drawing—

A denotes a rectangular case or box provided with a cover, B, which is so constructed as to be capable of being either readily applied thereto or removed therefrom, as may be desirable.

The said cover is formed in two portions, *a b*, hinged together, the front portion *a* being capable of being turned back upon the other in order to enable ready access to be had to the sink or pump compartment, to be hereinafter described.

Extending up from the bottom of the case A is a large rectangular tank or oil-holder, C, which is made of metal, and corresponds in length and width with the interior of the said case, and may have any desirable height or capacity.

On the top of the said tank, or arranged above the same, is one or more compartments, E E'. The front one, viz, E, we term the sink, which has a sloping or concave bottom, its greatest slope or concavity being at the mouth of the vent or return-pipe F, which is inserted in the bottom of the sink or top of the tank, and extends down into the interior of the latter, in manner as shown in fig. 4.

The said pipe F performs three separate functions—

First, it conveys the overflow or waste oil from the sink back into the tank.

Second, it serves as a vent to the tank; and,

Third, it prevents the oil in the tank from swashing or spurting upward into the sink under the rolling and pitching action of a vessel or ship during rough weather.

G is a pump which extends down into the tank, and is firmly secured to the bottom thereof. This pump may be either a suction, a lifting, or a force-pump, as may be desirable, and should be so arranged with respect to the tank and the return-tube that its nozzle or discharging end may stand directly over or in close proximity to the mouth of the return-pipe, in order that any overflow or drippings may run directly back into the tank.

The pump shown in the drawing is a force-pump of the ordinary construction, which is submerged in the oil in the tank and is worked by its handle J, as shown in fig. 4, its discharge-pipe or nozzle being provided with a stop-cock, K, as seen in such figure.

In supplying or filling a can or vessel with oil from the tank, we first turn the cock K so as to open the same, and next take hold of the handle of the pump-piston, and by working the same up and down we shall force the oil up through the discharge-pipe and into the can until the desired quantity is attained, when we shall again turn the stop-cock so as to shut off the flowage of the oil. Should any overflow, such will flow directly back through the return-pipe into the tank. Furthermore, the said return-pipe is provided near its top with one or more vent-holes, *e*, for the escape of any vapor that may be generated within the tank.

The said sink or compartment may also have one or more stands or annular supports, H, for holding one or more oil-feeders or cans, and it may also have a foraminous stand or plate arranged upon its bottom.

In rear of the said sink or pump compartment is another compartment, E', for reception of the various articles required for lubricating, or various other purposes.

Instead of making the case or inclosure above the tank in two compartments, it may have but one, the same constituting the sink, but I prefer the employment of the two, as shown in figs. 3 and 4 of the drawing.

O is a filling port, arranged within the compartment E, and provided with a screw-cap or stopper, P.

The said tank may be divided into two or more compartments for containing oils of different kinds, in which case, each compartment should be provided with a separate pump and return-pipe.

A cabinet constructed of the devices or parts arranged and combined as above set forth, and as shown in the accompanying drawing, constitutes an article of great utility and value for the purpose for which it is designed.

Having described our invention,

What we claim, and desire to secure by Letters Patent, is as follows:

1. An oil cabinet, substantially as described, the same consisting of a tank or holder, with an upper case, sink, or inclosure, and provided with a pump, and a vent-tube or waste-receiving orifice, combined and arranged together in manner, and for the purpose or object hereinbefore set forth.

2. The combination of the tank C, the compartments E E', pump G J K, and pipes O F, constructed, arranged, and operating together, in manner and for the purpose or object as set forth.

MOSES H. WILEY.
THOMAS MILLER.
JOHN H. B. LANG.

Witnesses:
F. P. HALE,
THOMAS DILLON.